(Model.)

W. F. WITHERINGTON.
Animal Trap.

No. 231,134. Patented Aug. 10, 1880.

Attest:
H. L. Penny.
Floyd Norris.

Inventor.
Willis F. Witherington
By. Johnson & Johnson
Atty's

UNITED STATES PATENT OFFICE.

WILLIS F. WITHERINGTON, OF KENTON, TENNESSEE.

ANIMAL-TRAP.

SPECIFICATION forming part of Letters Patent No. 231,134, dated August 10, 1880.

Application filed April 23, 1880. (Model.)

*To all whom it may concern:*

Be it known that I, WILLIS FRANKLIN WITHERINGTON, a citizen of the United States, residing at Kenton, in the county of Gibson and State of Tennessee, have invented new and useful Improvements in Animal-Traps, of which the following is a specification.

My invention relates to improvements in animal-traps in which the animal is entrapped and destroyed by impalement.

Figure 1:
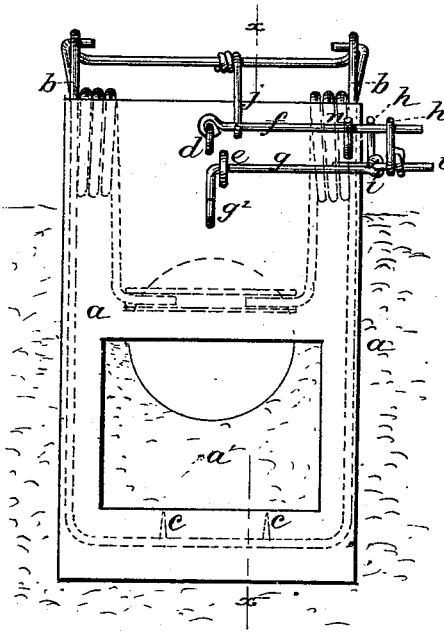
Figure 2:
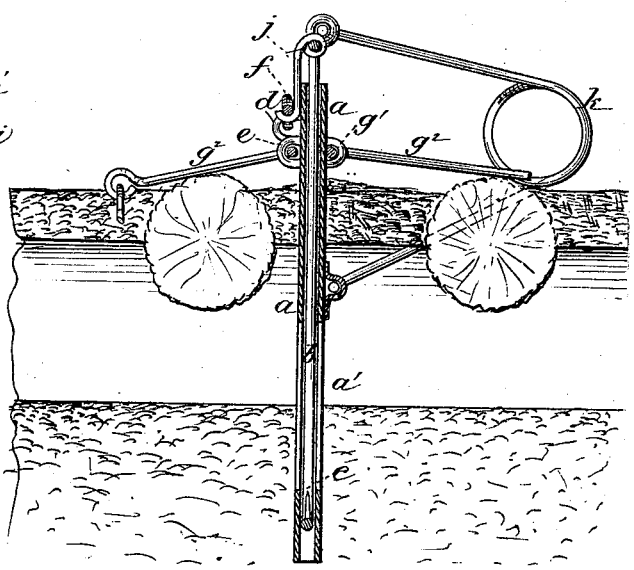

Figure 1 represents my improved trap in elevation as set for moles; Fig. 2, a vertical cross-section of the same.

Similar letters refer to the same parts in the several views.

The mechanism of the trap is connected with and supported by a frame, $a$, the sides of which form an interior open way, within which the wire slide $b$ of the impaling-points $c$ operates. A cheap way of forming the frame $a$ is by bending a sheet or sheets of tin and soldering the joining edges. An opening, $a'$, is cut in the sides of this frame near its lower end, within and across which the animal is trapped by the piercing-points.

The slide $b$, which carries the piercing-points, consists of a strong piece of wire bent in a rectangular form, the lower horizontal ends being soldered and carrying the piercing-points $c$, the sides rising in the open way along the edges of the frame $a$ and the upper end crossing above the open-way frame, which thus serves to contain and form a guide for the wire slide of the impaling-points.

The setting and tripping devices are secured to the upper part of the open-way frame, and as a mole-trap these are constructed and arranged as follows: A double eye, $d\ e$, one above the other, is centrally secured to one side of this frame, and into the upper eye, $d$, is linked one end of a setting and tripping arm, $f$, long enough to extend beyond the edge of the frame $a$, while in the lower eye, $e$, an L-shaped rod, $g$, is secured in horizontal position, its outer end being formed into a hook, $h$, and secured at a point, $i$, outside the edge of said frame. A second L-shaped rod, $g'$, is secured on the opposite side of the frame $a$ to an eye and to the point $i$, and terminates in a hook, $h'$. These rods $g\ g'$ are on the same horizontal plane, and their L-branches form arms $g^2$, which, when the trap is set, stand out in horizontal positions at right angles and on opposite sides of the frame, while the hooks $h\ h'$ are adapted to catch over the free end of the setting and tripping arm $f$, like a pair of pinchers, and thus hold said branch arms in their set positions. The wire slide is held down with its impaling-points concealed within the bottom part of the open-way frame by a hook-arm, $j$, depending from the top of said wire slide, and over which hook the tripping-arm $f$ is held by the hooks of the L-rods.

A coil-spring, $k$, is connected to one side of the frame by one arm, and by the other arm to the upper end of the slide. There is such a spring connected to each end of said slide, by which, when released from the holding-arm, the slide and its impaling-points are thrown up and impale the mole within the opening in the frame, through which it must pass in its course. In this position the trap is set in the ground, across the course of the mole, as shown in Fig. 2, by cutting out a portion of the track, so that the top of the opening $a'$ will be about half-way within the burrow or track of the mole, and the piercing-points will be below such track, the earth being firmly pressed around the edges of the frame and loosely filled in the cut-out parts of the track.

The branch arms $g^2$ stand out parallel with the mole-track, and beneath them I place a corn-cob or similar thing crosswise said track, so that the mole in passing beneath them will raise them by raising the loose earth, and thus open the hooks $h\ h'$ and releasing the tripping-arm $f$. The points will instantly rise and pierce the mole.

The springs are shown as arranged at right angles to the frame; but they may be arranged in the plane thereof.

The trap is operated in either direction of the travel of the mole.

The trap thus constructed may be adapted for rats by attaching a bait-hook to one of the branch arms $g^2$, and when so used only one of the hooks $h$ is used to trip the arm $f$ from a hook, $n$, fixed on the side of the frame.

I am aware that prior to my invention animal-traps have been made in which a sliding frame with stabbing-points have been arranged to operate across an opening, so that when the trap is set and the points being sprung will impale the animal passing through said frame-opening, the points being carried by a slide held and tripped by a catch and sprung by a coil-spring when tripped; also, that traps have been made to be sprung by the upward pressure of the mole upon a trigger-lever to disengage a tripper-lever to release stabbing-points and allow them to be sprung to impale the passing mole; and that a spring-frame adapted for being sprung upon and to hold the animal has been held in position to be tripped by a hook and tripping connections, so that my claim does not embrace, broadly, such a trap.

I claim—

In an animal-trap, the combination of the open-way frame $a$ and the slide $b$, carrying the impaling-points $c$ within said open-way, of the setting and tripping devices, consisting of the arm $f$, the bent rods $g$ $g'$ $g^2$ $g^2$, provided with hooks $h$ $h'$, the hook $j$ of the impaling-slide, and the springs $k$ $k$, all constructed and arranged for use substantially as herein set forth.

In testimony whereof I have hereunto set my hand in the presence of two subscribing witnesses.

WILLIS FRANKLIN WITHERINGTON.

Witnesses:
   THOMAS LACY MOSELEY,
   ROBERT HARRY McNEELY.